United States Patent [19]

Lindman et al.

[11] 4,345,996

[45] Aug. 24, 1982

[54] CONIC REACTION CHAMBER FOR WATER DECONTAMINATION

[75] Inventors: William E. Lindman, Fountain Valley; John A. Alexander, Cayucos, both of Calif.

[73] Assignee: Precipitator Corporation, Santa Fe Springs, Calif.

[21] Appl. No.: 189,600

[22] Filed: Sep. 22, 1980

Related U.S. Application Data

[60] Continuation-in-part of Ser. No. 189,339, Sep. 22, 1980, which is a division of Ser. No. 840,414, Oct. 7, 1977, Pat. No. 4,224,148, which is a division of Ser. No. 597,217, Jul. 18, 1975, abandoned.

[51] Int. Cl.³ .................. B01D 21/01; B01D 21/24
[52] U.S. Cl. .................................. 210/96.1; 210/139; 210/195.3; 210/202; 210/206; 210/208; 210/525; 210/534
[58] Field of Search ............... 204/149; 210/702, 709, 210/714, 721, 715, 716, 723, 724, 737, 738, 746, 748, 96.1, 173, 192, 195.3, 198.1, 199, 200–202, 205, 206, 208, 220, 221.3, 243, 252, 138, 139, 523, 525, 534

[56] References Cited

U.S. PATENT DOCUMENTS

| | | | |
|---|---|---|---|
| 2,116,053 | 5/1938 | Urbain et al. | 210/717 |
| 2,442,809 | 6/1948 | Hallier et al. | 210/206 |
| 3,522,173 | 7/1970 | Lindman et al. | 210/709 |
| 3,575,853 | 4/1971 | Gaughan et al. | 210/713 |
| 3,575,854 | 4/1971 | Richards | 210/720 |
| 3,583,910 | 6/1971 | Stoddard | 210/713 |
| 3,586,623 | 6/1971 | Kuhn | 210/763 |
| 3,617,559 | 11/1971 | Cywin | 210/713 |
| 3,728,253 | 4/1973 | Kaufman | 210/624 |
| 3,741,890 | 6/1973 | Smith et al. | 210/667 |
| 3,801,501 | 4/1974 | Kennedy | 210/724 |
| 3,903,000 | 9/1975 | Miura et al. | 210/748 |
| 3,948,774 | 4/1976 | Lindman | 210/192 |
| 3,997,436 | 12/1976 | Stoev et al. | 210/748 |

FOREIGN PATENT DOCUMENTS 703507 12/1979 U.S.S.R. ............................ 210/534

*Primary Examiner*—Peter A. Hruskoci
*Attorney, Agent, or Firm*—Howard L. Johnson

[57] ABSTRACT

Provides a self-cleaning conic reaction chamber having specific multiple conduit connections, sealable closure, internal mixer, external vibrators and dependent sludge accumulator which chamber can be flow connected to readily available handling units to form a stepwise acid-/iron/alkali assembly for treating contaminated liquid such as sewage or other waste water so as to obtain uncontaminated liquid and sterile sludge. Stepwise flow can be automated by adding stepping timer and electronic controller responsive to pH probes and pressure-, liquid level- and turbidity-sensors plus remote controlled valves, pumps, blowers and metering devices.

10 Claims, 6 Drawing Figures

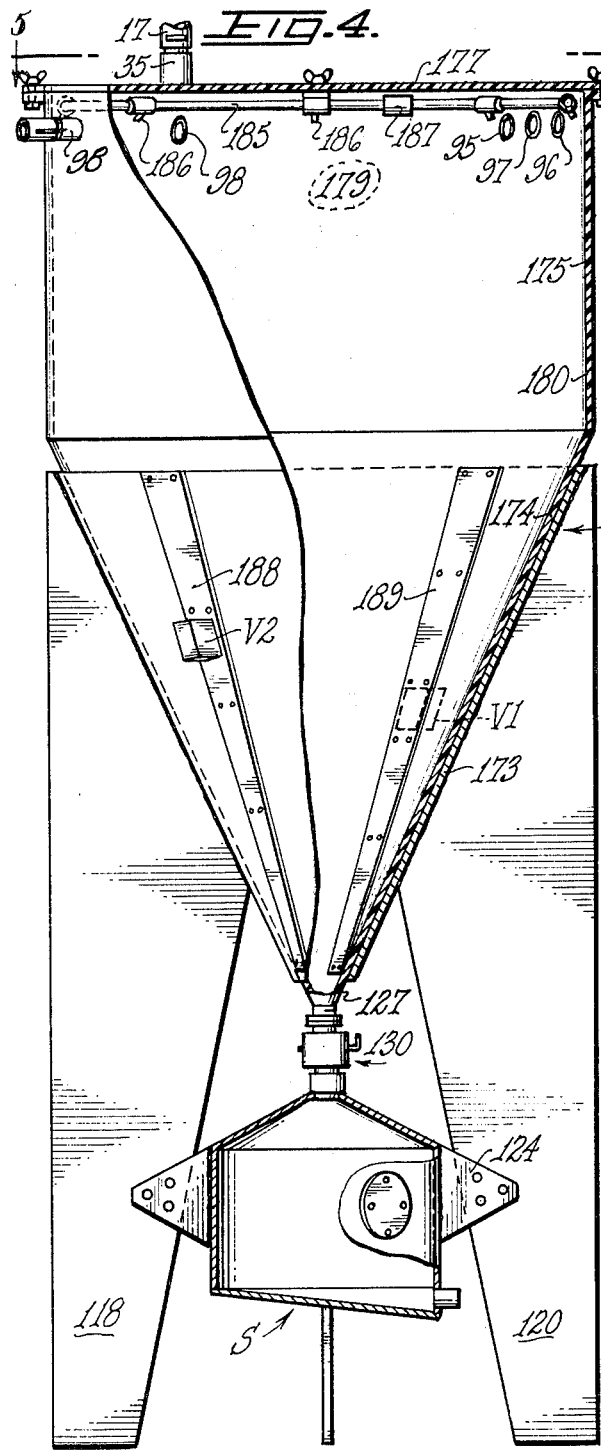
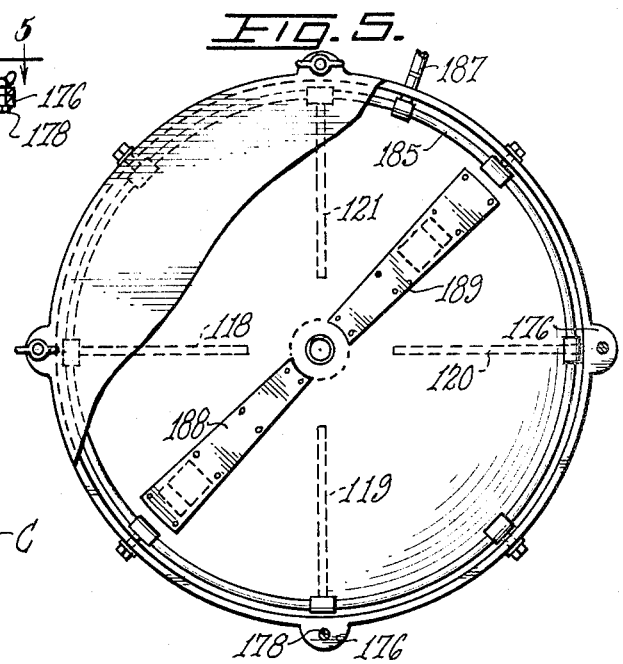
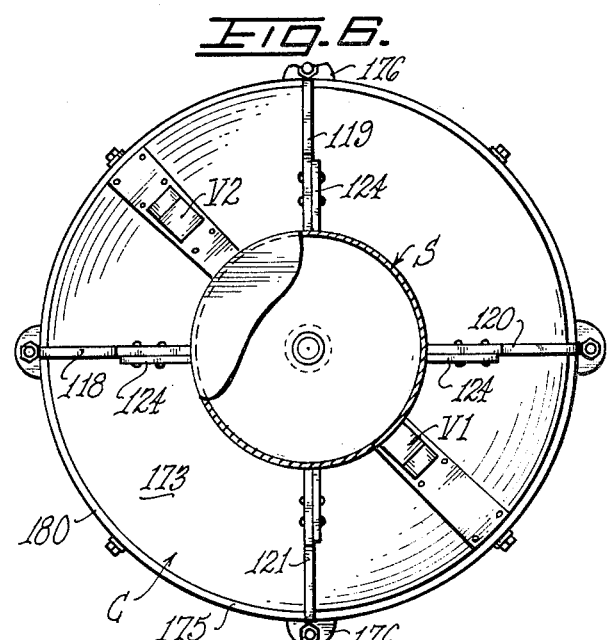
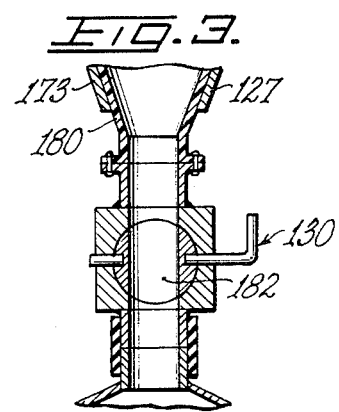
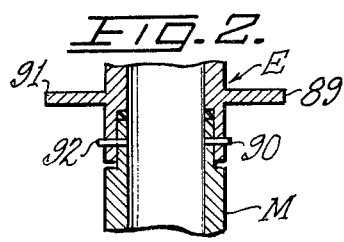

CONIC REACTION CHAMBER FOR WATER DECONTAMINATION

RELATED U.S. APPLICATION DATA

This is a continuation-in-part of Ser. No. 189,339 filed Sept. 22, 1980, which is a divisional application of Ser. No. 840,414, filed Oct. 7, 1977, now U.S. Pat. No. 4,224,148, issued Sept. 23, 1980, which was a divisional application of Ser. No. 597,217, filed July 18, 1975, now abandoned.

BACKGROUND OF THE INVENTION

In our U.S. application Ser. No. 597,217 there was disclosed a process and apparatus for separating as a solid from a (screened) contaminated polar liquid such as water, dissolved and/or suspended particles, thus obtaining (a) essentially pure liquid (e.g. water) and (b) sterile sludge. In some instances, desired ingredients, such as precious metals, were recoverable from the sludge by fractionation. Typical feed stocks were municipal sewage and/or industrial/agriculture waste water. The apparatus consisted of sequentially flow-connected units comprising (a) an aerating and macerating collection tank (surge tank), (b) an acidifying chamber into which $SO_2$ is metered and mixed, (c) a submerged-iron-bed containing tank which (in response to flow through of the acidic media) furnishes ferric/ferrous ions for oxidative reaction with the flow stream, (d) means for controlled admixture of air and alkaline reagent (e.g. NaOH or $Ca(OH)_2$) into the stream, (e) flocculation and solids-separation means including pH control. Each segment of the monitored and flow-controlled stream would be retained in each successive unit for the required reaction/treatment time, and then flowed to the next unit; thus when all segments of the stream were stepped forward simultaneously, the residence time in each unit was essentially the same, namely it was the longest reaction time required in any unit if some were unequal.

However the treatment pattern exhibited some points of weakness when restricted to use of that apparatus. Thus, if the flow had to be suspended for correction of a local factor at any particular point along the line, the entire flow necessarily stopped. This could result in reestablishment in the subsequent flow of some organisms (often reintroduced from the air) which had earlier been knocked out of the stream by the initial acid treatment step. The composite procedure which uses successive treatment by strong acid and then by strong alkali ensures elimination of all micro-organisms; those not eliminated by one reagent are eliminated by the other. However when the two extremes of pH occur at opposite ends of a relatively long intermediate procedure, the problem of reinfection from apparatus which is subsequent to initial acid-treatment units also increases. Other apparatus problems include sediment buildup on the walls and lime encrustation of conduits and valves. These can be combatted by acid treatment if promoted by alkali.

Also, a scheduled flow procedure desirably should be adaptable so as to accommodate the differences in feed stocks. For example, proteins denature and float or settle fairly rapidly in acid media and should be promptly removed substantially as formed (rather than carried through to the final alkaline separation). This might require a structural by-pass or alternate flow, if such a permanent pattern were not desired.

Alternately, colloidal material associated with oil and grease (e.g. refinery waste stream; laundry or car wash effluent; etc.) may require variations of procedure such as flow rate, residence time, pH, etc. directed to the particular contaminant and/or its specific state (such as emulsive). Also, particular flocculants may show greater adherence to the iron bed or chamber walls of the apparatus which therefor have to be flushed down oftener or with stronger reagents. In brief, even though successive sub-units are assembled in a permanent flow stream or "assembly line", at times it is highly desirable to be able to treat one or the other as an independently adjustable unit while the others are still left to function as parts of the whole.

The basic process detailed in our Ser. No. 597,217 may be summarized as a stepwise treatment of flowable polar liquid such as water, which liquid contains dissolved and/or suspended contaminants. At least a minimum (0.1% wt.) of total solid contaminant should be capable of accepting a galvanic charge, which minimum quantity may be added if not initially present. All particulate matter present should have a size in the range of about 30 to about 225 microns diameter, free surface energy of about 100 to about 500 ergs/cm$^2$ and density of about 1.05 to about 2.0 g/cm$^3$. That is, gross solids are initially removed as by screening and the remainder are reduced to this particle size to which a galvanic charge is then imparted by pH control of the liquid medium which is held or flowed in electrically insulated apparatus. The body of liquid is moved stepwise through successive reaction units and connecting flow channels which are constructed in accordance with specific dimensionless parameters so as to avoid undesired coalescence (precipitation) of the moving, charged particles.

The body of liquid is first exposed to a strong acidic oxidizing environment of about pH 2.0 to about 2.5 produced by admixture therewith of sulfur dioxide, air and free electrons/ions derived from a flow-through bed of pieces of iron. With continued intermixing of air or oxygen, the body of liquid is then made strongly alkaline by addition of lime or sodium hydroxide at pH about 8 to about 11. Desirably with electrically grounding the liquid, ferric hydroxide is flocculated and carries down other contaminants with it. The resulting sterile sludge and supernatent liquid (decontaminated water) can be further processed if desired, by dehydrating and fractionating the former, and filtration plus incorporation of oxygen into the latter.

The present apparatus provides a more effective means of carrying out such basic process by coupling the present conic reaction chamber with commercially available handling and control units to form a complete flow apparatus, which may even be automated.

STATEMENT OF THE INVENTION

Accordingly there is now provided an improved, integrated, multi-unit apparatus for better effecting the above described flow procedure of stepwise liquid decontamination, which apparatus utilizes a hub-like or central multi-reaction vessel, advantageously of up-standing conic configuration and coupled by conduit, pump and valve means to "satellite" reaction and supply units which collectively enable effectuation of the successive steps of a complete treatment but now achieved with selective interconnections or flow channels. The multi or selective reaction cone is also self-cleaning by virtue of its alternate use for acidic and alkaline reactions and also by provision of an upper washdown spray conduit which is connected to an acidic or biocide supply source. The conic reaction unit may be an article of commerce by itself and is provided around its upper (cylindrical) perimeter with coupling means for flow connection to separate acidic and alkaline supply chambers and for introduction of the liquid feed stock to the interior. The lower, generally apical area has dual outlets (for liquid and sediment) one connected to a dependent sludge separation sub-unit which acts as a settling chamber. The conic walls preferably have no greater than about 27° slant from a generally vertical axis in order to prevent sludge from clinging to them, and externally the upstanding or outslanted walls carry powerdriven vibrators which (especially with a greater than 27° cone) may be required to accelerate flocculation and particle (sludge) separation from the body of liquid therein. The interior of the cone also has a motor driven mixing or stirrer unit disposed therein, as well as means for introducing external air and gaseous reactants such as sulfur dioxide into the body of liquid; it also has a closure seal used when such gases are present.

The satellite or associated units of the assembly comprise conduit and in-line mixer connected reagent containers respectively containing gaseous sulfur dioxide, sulfuric acid, sodium hydroxide, lime, e.g. such as slurried, and a final oxidative treating chemical such as chlorine or ozone. Selectively flow connected to the conic reactor by conduit, pump and valve means are (a) primary aeration or surge tank with submerged macerator/comminutor means, (b) a flow-through iron containing tank for incorporation of ferric/ferrous ions and free electrons into the acidic stream, (c) sludge separation and handling means to the extent required, (d) a terminal product liquid reservoir with associated filter and (gaseous) oxidation means for finishing treatment as required.

A flow pattern can thus be established with treatment time and sequence particularly adapted to a particular feed stock, and the assembly then be set for continuous operation as controlled by a stepping switch and a unit timer which is responsive to the electronic monitoring elements of each unit.

BRIEF DESCRIPTION OF THE DRAWINGS

FIG. 2 is an axial section taken through a conduit coupling.

FIG. 3 is an axial section taken through the outlet sludge valve of FIG. 4.

FIG. 4 is a partial side elevational view and vertical section taken through the conic reaction chamber with dependent sludge separator.

FIG. 5 is a top view of the chamber of FIG. 4 with a portion of the closure removed to show the interior.

FIG. 6 is a bottom plan view of the conic reaction chamber.

DETAILED DESCRIPTION

Figure 1:
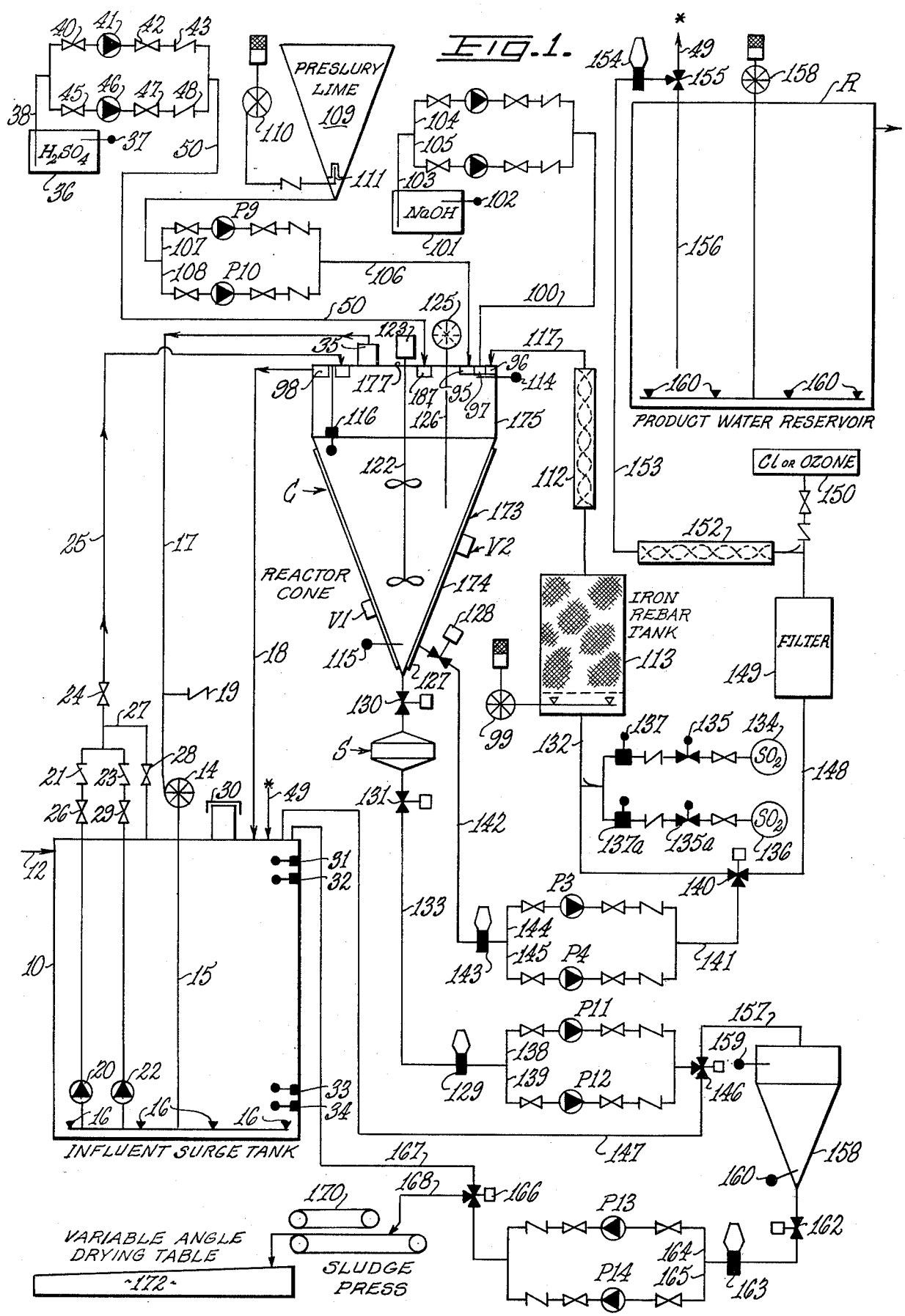
FIG. 1 is a minimal flow pattern and semi-schematic apparatus assembly for acid/alkali/iron treatment used for chemically effected soild separation of contaminants dispersed in a polar liquid such as water.

An accumulation and preliminary treatment tank 10, FIG. 1 is supplied by an influent conduit 12 with the waste water or other contaminant liquid to be treated. A blower 14 introduces external air into the body of liquid through conduit 15 and by a plurality of bottom-located outlet nozzles 16, which action also causes a turbulance and mixing of the liquid and its particle content. Agitation is also promoted by action of a pair of submerged chopper/grinder (macerator) pumps 20, 22 which ingest a steady stream of the tank content, reduce solids to a maximum particle size as required and move the resultant mix through ball valves 26, 29, check valves 21, 23 and ball valve 24 to a delivery line 25 which is coupled to the reaction cone C.

A return conduit 27 and ball valve 28 allow the pump output to continuously recirculate to the surge tank 10 when so desired, or the valves may be set for fractional recirculation as required. The tank 10 is also provided with an odor-adsorbant type gas vent 30 with activated carbon and a plurality of liquid level control or monitoring units 31, 32, 33, 34 located at upper and lower depths and electrically connected to a central control which balances in-flow and out-flow by remote controlled pump and valve action of the flow system. A liquid overflow line 18 and gas exhaust line 17 also connect the reaction cone C to the surge tank 10 the latter through the blower 14 which is equipped with a vacuum release valve 19. A return line 49 connects the tank 10 to the terminal product tank R.

A sulfuric acid supply tank 36, with liquid level sensor 37, is connected by outflow line 38 leading to alternate paths of control sequence, respectively, ball valve 40, pump 41, ball valve 42 and check valve 43, or ball valve 45, pump 46, ball valve 47 and check valve 48. Both sequences are flow connected to acid supply line 50 which is coupled to the reaction cone C, FIG. 1; by an alternate flow of $SO_2$ an, acid supply can also enter through an in-line or motionless mixer 112 from tanks 134, 136 as hereinafter detailed. Paired or alternate control sequences involving pump and valve units are used throughout in order to have an alternate flow available in the event that the first used requires repair.

Continuing the FIG. 1 flow apparatus, an aqueous sodium hydroxide supply container 101, with liquid level sensor 102 is connected by conduit 103 through alternate control sequences 104, 105 (similar to the sulfuric acid control sequences) to supply conduit 100 which empties into the reaction cone C. A lime hopper 109 with eductor unit 111 and air blower 110 supplies lime to the reaction cone C through control sequences 107, 108 and supply conduit 106. An external air blower 125 through conduit 126 introduces air into the body of liquid within the reaction cone C. The lime hopper 109 may be supplied with Preslurried Lime which is a by-product of the acetylene industry and contains about 40% solid matter. This is usually pumpable without further addition of liquid. The lime supply conduit 106 is selectively attachable to a coupling unit 95, and the sodium hydroxide supply conduit 100 is detachably coupled to a similar unit 97, both located adjacent the upper edge of the reaction vessel C.

Flow-connected to the reaction vessel C by conduit 117 and in-line mixer 112 is an acidic iron chamber 113 containing a flow-through bed formed by small pieces of metallic iron such as "rebar" (iron rods used in reinforcing concrete), the chamber also being supplied with external air by a blower 99. The bottom inlet line 132 of the iron tank 113 is connected to gaseous sulfur dioxide containers 134, 136 by control sequences which include solenoid valves 135, 135a, and pressure sensors 137, 137a. The conduit 132 arises from a three-way diverter valve 140 which through conduits 141, 142 receives the supernatent or liquid outflow from the reaction cone C after passage through cone outlet valve 128, turbidity sensor 143 and control sequences 144, 145. This conduit 142, 141 thus can convey initial feed stock or its liquid to the iron tank from the reaction cone C after preliminary separation of sediment through valve 130 to the sludge separator S. By way of the iron tank 113 and mixer 112 the supernatent flow may thus be reintroduced to the reaction chamber C and after subsequent treatment, including alkalization and flocculation, the new supernatent liquid by way of the the same flow line 142, 141 may at the diverter valve 140 be directed through conduit 148 and filter 149 for introduction of gaseous oxidizer from storage container 150, then through in-line mixer 152, conduit 153 and turbidity sensor 154 to three-way valve 155. It may then be returned by conduit 49 to the initial surge tank 10, if required, or run into the Product Reservoir R by conduit 156. The Product Reservoir R also has an air blower 158 for bottom level aeration of the contained liquid by way of dependent nozzles 160.

Returning to the outflow from the reaction vessel C (which will be detailed subsequently), sludge from the separator unit S passes through a motorized ball valve 131 and conduit 133 to a sludge sensor 129 and through alternate control sequences 138, 139 to a three-way diverter valve 146 connecting to return conduit 147 leading to the surge tank 10 and by alternate conduit 157 is conveyed to a settling cone 158 having level sensors 159, 160. From the cone apex, flowable sludge passes through a motorized ball valve 162 and a sludge sensor 163 to alternate control sequences 164, 165 and then to a three-way diverter valve 166 connecting to return conduit 167 leading to the surge tank 10 and by alternate conduit 168 to an endless belt type, sludge press 170 and a variable angle drying table 172, which latter may be essentially a flat cement slab with elevating jacks (not shown) located at one end for optional use.

As detailed in FIG. 4, the reaction vessel C is located upright by four support legs 118, 119, 120, 121. The vessel is formed by a metallic shell 173 having a conic body segment 174 and an upper, generally cylindrical segment 175 provided with a top lip or outturned flange 176 to which a flat top or closure 177 may be secured as by clamps or bolts 178. Such cover is used to form a gas chamber 179 overlying a body of liquid held within the cone and thereabove. Gas (such as oxygen or sulfur dioxide) after injection escaping unreacted from the contained liquid, may be moved from this confined space 179 through control valve 35 and conduit 17 for submerged entry into the surge tank 10 by means of blower 14.

The lower apical end 127 of the vessel C is connected through a ball type drainage valve 130 (FIG. 3) to a dependent sludge receptacle or container S. The latter is fastened to the support legs by corresponding bracket plates 124. Within the metallic shell 173, is an acid- and alkali-resistant liner 180 which may be formed of reinforced fiberglass and is adhered to the metal body wall. The inward, liquid-contacting surface of the liner should have a smooth, low friction face so as to minimize sediment or precipitate clinging thereto instead of sliding down the sloping face to the bottom outlet and into the sludge receptacle S through a normally open aperture 182 of the connecting ball valve 130. Such liner can also be formed of epoxy resin, sprayed onto the metal; or by 30 mil polyvinylchloride molded as a rigid form.

The motor-driven mixer 122, 123 and the air blower 125 may each be separately suspended into the liquid volume of the reactor C when the top of the vessel is left uncovered. Alternately the motor 123 may be mounted on the closure 177 with the drive shaft 122 extending therethrough; similarly the blower 125 may be mounted atop the closure 177 with the air delivery conduit 126 extending therethrough into the body of contained liquid.

Secured about the inner perimeter of the cylindrical segment 175 of the conic reactor C, adjacent the upper edge or mouth thereof, is an encircling conduit ring 185 having a plurality of spray outlet apertures or nozzles 186 directed to flush or wash down the inner wall surface of the reactor by the fan-spread pattern of liquid emitted therefrom. The ring 185 is flow connected to the sulfuric acid supply conduit 50 (or to a biocide supply) through the valve coupling 187. The cylindrical segment 175 of the reactor C also has a coupling attachment 97 for the sodium hydroxide supply conduit 100 plus the coupling attachment 98 for the overflow line 18, and 96 for line 117.

Located on opposite sides of the conic segment 174 of the reactor C, spotted along a helical path, are a pair of compressed-air powered vibrators V1 and V2, which are inwardly fastened to a respective anchorage plate 188, 189 and project radially outward through the metallic body 173; that is, each longitudinal strut or anchorage plate sandwiches a strip of the liner 180 between it and the reinforcing shell 173. Simultaneous operation of the vibrators (at different frequencies) is found to eliminate potential "dead spots" (of sediment-/particle attachment) along the down sloped surface wall. Also, during acid and alkaline precipitation/flocculation, the vibrator action accelerates the reaction by promoting intermixing. As the inclination of the conic walls increases beyond about 27° from the vertical axis, the need for such vibrators is correspondingly increased in order to overcome the flow resistance offered by the walls, which resistance is of course increased by roughness of the walls. Such initial roughness of the metal cone is reduced, as noted, by coating its inner surface with synthetic resin. Alternately the so-called "Zorb" tanks may be used, made by Polycal Plastics Corp. of high density polyethylene. Thus the liner 180 may either be separate or preformed (pre-existing) or be formed in situ on the interior of the supporting cone or shell 173.

A typical quick coupling construction for attaching flexible conduits to the Reaction Chamber C is shown in FIG. 2. The conduit end E has a radially opposing pair of grab handles 89, 91 and is formed with a pair of L-shaped bayonet slots which thrust-engage and upon partial rotation seat a corresponding pair of coupling pins 90, 92 carried by the coupling mouth M which is fixed on the cone C or the closure 177.

OPERATION

Raw sewage was run into the surge tank 10 as obtained from Los Coyotes Water Reclamation Center. It had a pH of 6.98, turbidity 175 NTU, iron content 4.0 mg/l, TDS 1125 mg/l, coliform count 79 million, BOD 112 mg/l, suspended solids 167 mg/l.

Without aeration, it was moved to the Reaction Cone C through conduit 25 by action of a Vaughn chopper grinder pump 20 or 22. This pump had a capacity of 3 gal/min and it took about 25 min. to transfer 75 gal. of this feed stock to the 80 gal. Cone Reactor C. During this period, the liquid outlet valve 128, as well as the sludge valves 130, 131 remained closed and the chopper pump(s) 20, 22 was shut off by the liquid level control 114. However the valves 128 and 140 could have remained open and the incoming feed allowed to circulate through the iron tank 113 and mixer 112 and returned to the Cone C through conduit 117, either with or without addition of sulfur dioxide or sulfuric acid—i.e. to the extent that it was acidic, the flow would accumulate ions and electrons from the iron tank.

The Acidification cycle then commences with activation of the pump P3 or P4 which moves the feed stock from the bottom of the Reactor C through outlet valve 128 and conduits 142, 141, 132 into the Iron Tank 113, then through motionless mixer 112 and return conduit 117 (via coupling attachment 96) to the Reactor C where it continues to be agitated by the slow moving mixer 122.

With activation of the pump P3 or P4, a central pH control meter which is connected to the pH sensor 116 of the Reactor C activates the solenoid valve 135 or 135a which injects sulfur dioxide gas from pressure container 134 or 136 through the pressure sensor 137 or 137a. Alternate to acidifying with sulfur dioxide, sulfuric acid from container 37 can be added to the Cone C by action of the pump 41 or 46, and the body of liquid from C circulated through the iron tank 113 as just described. Some contaminants are found to be more responsive to treatment with one reagent than the other; trail runs may initially be made.

Typically about 15 minutes is allowed for acidic reaction with the feed stock itself, plus an equal time for reaction of the mixture with the iron tank components including oxygen or air. Accordingly if the feed stock is circulated through the iron tank as soon as sulfuric acid or sulfur dioxide commences to be added to it, such circulation may continue for about half an hour. Thus, with a 75 gal. capacity reactor C and recirculation pump operation of 14 gal/min, the liquid flow completes an iron and acidic injection passage every $5\frac{1}{2}$ minutes.

The pumps P3, P4 stop at the end of the acidic cycle and the central stepping switch controller (such as made by Amerace Corp., Control Products Division, "Agastat" TM, or the timing control made by Eagle Signal Division of Gulf & Western Mfg. Co.) starts the alkylation cycle which again is governed by the pH meter in response to its variously distributed pH probes. (Such units are made, for example, by Great Lakes Instruments, Inc.) Lime slurry from hopper 109 is added on a pulsed basis to the Reactor C through conduit 106 by action of a low volume progressing cavity pump P9 or P10 which is activated for 10 seconds of every minute. (pump by Robbins & Meyers Inc.) When pH is raised to about 10, the pump is deactivated and mixing by the slow mixer 122, 123 is continued (tank C mixer by Pro Quip Inc.) for a total of about 20 minutes. In some instances, sodium hydroxide is used in conjunction with the lime.

After mixing is stopped, valve 130 is opened (or may have remained open during alkalization) and settling is allowed for 3 to 4 hours, with the use of the vibrators as may be required of less steep-walled reactor cones. The sludge separator S should hold the total solid content of the Reactor C. For an 80 gal. cone, a sludge container S of about 4 gal. is adequate.

Thus a total batch time is $5\frac{1}{2}$ hours based on: filling 25 min.; acidification/iron contact 30 min.; neutralization 20 min; settling 4 hrs; liquid & sludge discharge 15 min. In a 75 gal assembly, 4 batches a day are possible =300 gallons/day capacity.

After flocculation of the alkalization cycle, the supernatent liquid from the above Los Coyotes raw sewage had coliform MPN reduced to 70/100 ml. Another raw sewage sample which in addition was given oxidation treatment following flocculation had initial 4,900,000 coliform MPN/100 ml reduced to less than 2.2 MPN/100 ml; the processed sludge was also less than 2.2 MPN/100 ml.

It was also demonstrated that initial aeration/oxidation in the surge tank 10 is of great value in reducing Biochemical oxygen demand (BOD). Raw sewage with initial BOD 158.3 mg/l was reduced to 128.0 mg/l with 20 hours aeration, and to 86.7 mg/l with 40 hr. aeration. With 20 hr. aeration plus flocculation plus 20 hr. post aeration it was reduced to 38.7 mg/l. These runs illustrate the cumulative effect of the successive steps. Thus the above result (70/100 ml) which was obtained without initial aeration in tank 10 for purposes of illustration, would have been still further reduced by the $5\frac{1}{2}$ hour cycle time spend in the surge tank 10; and would be further reduced by post cycle oxidation, if required.

The various manufacturers herein named as suppliers of assembly-component elements are cited merely as showing the commerical availability of such parts which can be added to the Conic Reaction Chamber to complete a flow assembly. Sources for other components include chopper grinder pump by LFE Inc.; comminutor by Disposable Waste Systems, Inc.; chemical metering pumps by Neptune; $SO_2$ gas cylinders by Virginia Chemical; Solenoid teflon TM valves by Fluorcarbon; pressure sensors by Matheson; liquid level controls by Chas. F. Warwick Co.; sludge meters by Automation Products Inc. "dynatrol" TM; air diffusers by Ramco Sales; blowers by Rootes or Sutorbilt; in-line mixers by Luwa Corp. or Kenics Corp.; chlorinator by Capital Controls Co.; Ozonator by PCI Corp.; vibrators by Vibco Vibration Products Inc. The air blower 125 may be an aspirator type such as produced by Aeration Industries Inc. An inductor type sulfonator which can be used for $SO_2$ injection into conduit 132 is also made by Capital Controls Co.

We claim:

1. A mixing and reaction chamber particularly adapted for effecting selective stepwise treatment of a flowable, contaminated body of liquid therein, said chamber having multiple inlet means with conduit coupling means for flow coupling respectively to acidic and alkaline reagent supply sources and for introduction of said body of liquid into the chamber, said chamber having an upper generally cylindrical segment and a lower conic body formed of upwardly outspread, inwardly smooth walls and terminating in a lower generally apical area, said chamber having selective flow control and dual outlet means for separately withdrawing from the contained body of liquid a solid particle component and a supernatent liquid component separated therefrom, said conic body having means for mixing the body of liquid and additionally having means for selective introduction of gaseous reagents including air into the body of liquid for reaction therewith, the smooth walls of said conic body including an acid and alkali resistant polymeric-resin liner and an outer support frame including at least one longitudinal anchorage strut disposed inwardly overlying said liner and having power driven vibration means carried by said support frame and fastened to said strut through said liner for accentuating formation and accumulation of solid particles in said apical area in response to introduction of said acidic or alkaline reagents.

2. A mixing and reaction chamber according to claim 1 which additionally includes spray outlet means disposed about an inner margin adjacent the top edge of said conic body and having coupling means for flow connection to said acidic reagent supply source whereby, in the absence of said body of liquid, the chamber walls may be washed down with the acidic reagent.

3. A mixing and reaction chamber according to claim 1 wherein said liner comprises resin-impregnated fibrous glass.

4. A mixing and reaction chamber according to claim 1 wherein said conic body walls have no greater than about 27° slant from a generally vertical axis of the cone.

5. A mixing and reaction chamber according to claim 1 which includes a top closure having means for sealing engagement with the top edge of said chamber, thereby to complete a gas containing chamber overlying said body of liquid, and conduit coupling means for supplying and withdrawing gas from said overlying chamber.

6. An assembly for processing contaminated liquid so as to produce sterile solid material and substantially uncontaminated liquid therefrom, comprising in flow-connected association;

a mixing and reaction chamber according to claim 1 disposed in functional supply connection with separate storage containers of acidic reagent and alkaline reagent, an iron reaction chamber containing a flow-through iron bed adapted to introduce ferrous and ferric ions into said body of liquid when acidified, the iron reaction chamber being disposed to receive liquid flow from said outlet means and being flow connected to deliver an outflow back to the mixing and reaction chamber where alkaline reagent may be added thereto, process control means including pH sensor and remote operated pump and valve means for effecting stepwise operation including addition of an amount of said acidic reagent from its storage container to the contaminated liquid in said mixing and reaction chamber to produce pH of about 2 and for continuous circulation of said liquid jointly through the mixing and reaction chamber and through the iron reaction chamber in response to timer means forming part of said control means, said control means also including means for stopping said last circulation and thereafter adding alkaline reagent from its respective storage container to the acidified body of liquid in the mixing and reaction chamber so as to produce a pH of about 10.

7. An assembly according to claim 6 wherein said acidic reagent storage containers comprise separate containers for sulfuric acid and for sulfur dioxide gas, which containers are flow connected respectively to supply said mixing and reaction chamber and said iron reaction chamber.

8. An assembly according to claim 6 which additionally includes filtration and oxidizing means for treating the liquid component of said body of liquid after separation of solid contaminants therefrom, said oxidizing means constituting a final treatment unit of said assembly.

9. An assembly according to claim 8 which additionally includes comminuting means and aeration/oxidation means for treating said body of liquid prior to introduction into said mixing and reaction chamber.

10. An assembly according to claim 6 which additionally includes means for separation of liquid from said solid particle component subsequent to said mixing and reaction chamber, including flow means for returning such separated liquid to the initial body of liquid for continued flow treatment therewith.

* * * * *